G. F. MADDEN.
BALING PRESS.
APPLICATION FILED JULY 10, 1913.
1,100,592.
Patented June 16, 1914.
2 SHEETS—SHEET 1.
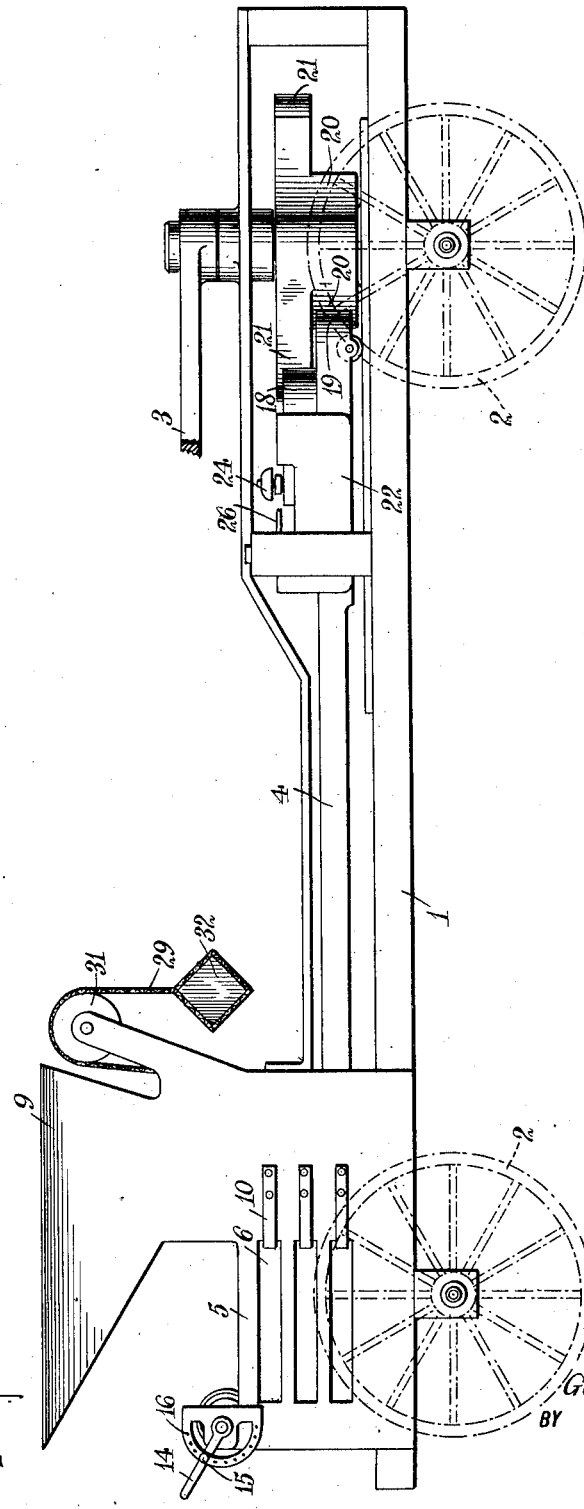
WITNESSES
H. J. Walker
A. L. Kitchin
INVENTOR
George F. Madden
BY
Munn & Co.
ATTORNEYS

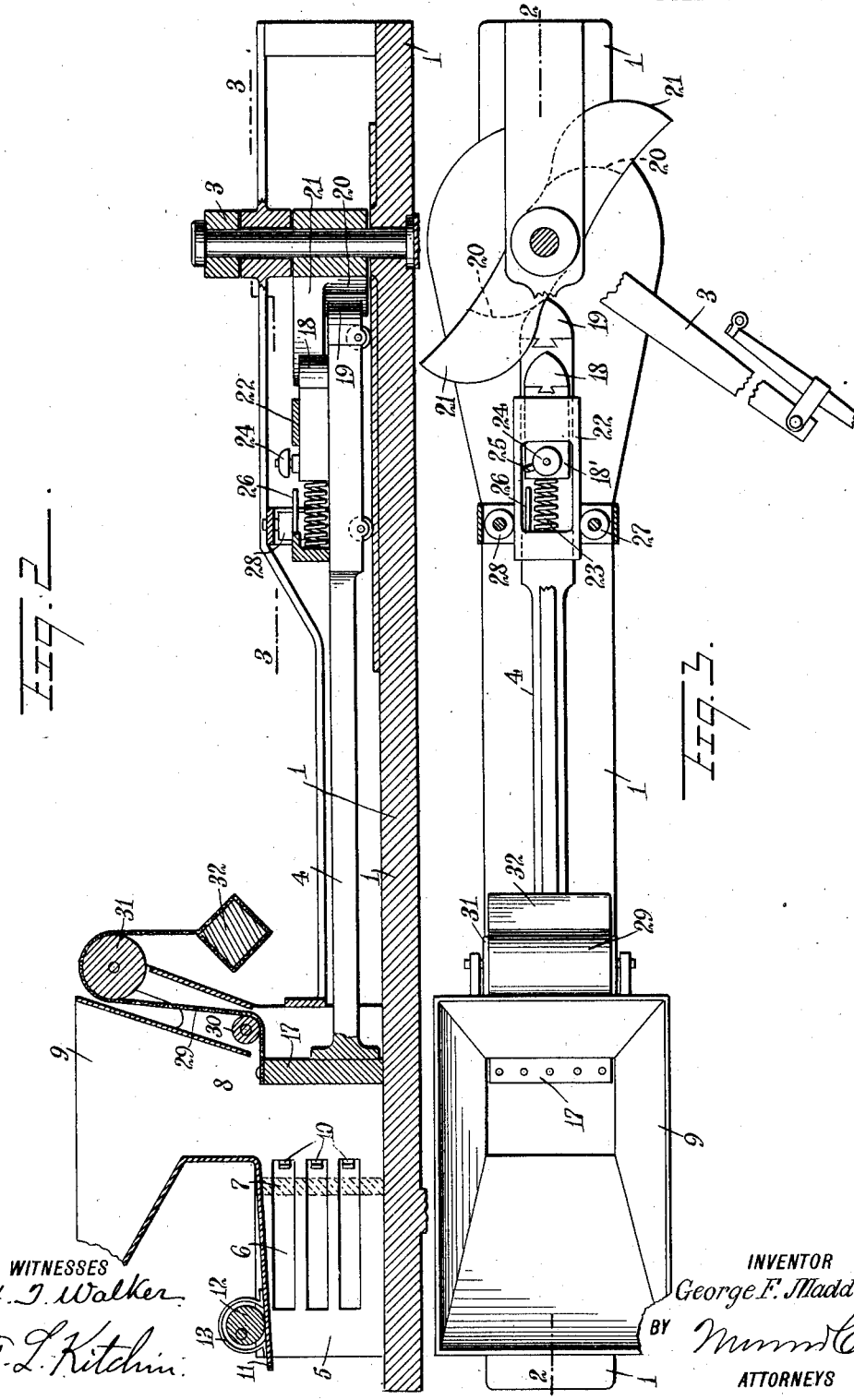

UNITED STATES PATENT OFFICE.

GEORGE F. MADDEN, OF LEETON, UTAH.

BALING-PRESS.

1,100,592.  Specification of Letters Patent.  Patented June 16, 1914.

Application filed July 10, 1913.  Serial No. 778,296.

*To all whom it may concern:*

Be it known that I, GEORGE F. MADDEN, a citizen of the United States, and a resident of Leeton, in the county of Uinta and State of Utah, have invented a new and Improved Baling-Press, of which the following is a full, clear, and exact description.

This invention relates to improvements in baling presses, and particularly to a press for baling hay and the like.

The object of the invention is to produce a press having a plunger actuated by cams in one direction for producing a pressing action and actuated by a weight for causing a return movement.

In carrying out the object of the invention a body of any desired kind is provided on which is arranged a housing in which the bale is to be formed. Associated with this housing is a hopper for guiding the material being baled into a position in front of the plunger. Associated with the plunger is a belt structure which is moved by the plunger in one direction and moved by a weight in an opposite direction, the belt acting in the double capacity of an apron for preventing the feeding of material into the housing while the plunger is in a forward position, and as means for retracting the plunger by reason of the weight acting thereon. The plunger is actuated by a suitable set of cams which in turn are actuated by any desired power, as for instance a lever which may have connected thereto, horses or other draft means.

In the accompanying drawings—Figure 1 is a side view of a baling press embodying the invention; Fig. 2 is a longitudinal vertical section through the structure shown in Fig. 1; and Fig. 3 is a top plan view of the structure shown in Fig. 1, certain parts being broken away.

Referring to the accompanying drawings by numeral 1 indicates the base of the press which may be supported by any desired means, as for instance wheels 2. In use the wheels 2 are preferably removed so that when horses are secured to the lever 3 the same could easily move in a circle and step over the plunger rod 4 and base 1. Arranged at one end of base 1 is a housing 5 in which the bale is pressed. The housing 1 is provided with apertures 6 and with a rear end member 7. Arranged near the throat 8 of hopper 9 are a plurality of spring pressed stops 10 projecting through the apertures 6 so as to prevent the return of the hay or other material being baled, and consequently allow the new supply from hopper 9 to pass through throat 8 into housing 5. The top 11 of the housing 5 is preferably made flexible, and is designed to be actuated or have the rear end moved downwardly by an eccentric roller 12 which operates in a suitable band 13. When the end 7 has been forced toward the discharge part of the housing 5 a sufficient distance the eccentric 12 is moved by handle 14 until end 7 has been properly clamped and then pin 15 is passed through a suitable aperture in rack 16 and through or into an aperture on handle 14 whereby the eccentric is locked. In this way the end 7 may be locked at any desired distance from the stops 10 in order that different sized bales may be produced.

A plunger 17 is provided for pressing the bale, which plunger is actuated by a plunger rod 4 provided at its forward end with cam noses 18 and 19, these noses being superimposed and offset for pivotally engaging the cams 20 and 21, respectively. The nose 18 is slidingly mounted in a guiding frame 22 which is rigidly secured to the plunger rod 4. The nose support 18' is held in place by frame 22 and is acted upon by spring 23 for providing relief in case the plunger 17 strikes a hard substance or gets clogged for any reason. An alarm bell 24 is provided which has an arm or extension 25 engaged by projection 26 so as to sound the alarm when nose 18 and the support 18' is moved sufficiently for compressing spring 23 to an appreciable extent. Spring 23 is designed to be made of such strength as to not be compressed during the formation of the bale and to be compressed only when an obstruction or too great a pressure is being used.

As clearly shown in Fig. 3 guiding rollers 27 and 28 are provided for the plunger rod 4 so as to cause the same to properly reciprocate, and to prevent swinging thereof under the action of cams 20 and 21. The noses 18 and 19 are curved on opposite sides as shown in Fig. 3 so as to properly act against cams 20 and 21, and to properly move back to their original position when the cams 20 and 21 have passed. In connection with the moving back of rod 4 to its original position it will be observed that a belt 29 is rigidly secured to plunger 17 and passes over idlers 30 and 31, and has secured to its opposite end a weight 32 which continually acts thereon for returning the plunger and associate parts to their original position as shown in the drawing.

It will be noted that the cams 20 and 21 are cast in one piece, but if desired they may be cast in parts. As shown in Fig. 3 the noses 18 and 19 are arranged to successively engage the cams 20 and 21, nose 19 first engaging cam 20 and after cam 20 has moved the rod 4 as far as possible cam 21 begins to act against nose 18 for moving the rod 4 its complete stroke.

Having thus described my invention, what I claim and desire to secure by Letters Patent, is:—

1. In a baling press of the character described, a base, a housing arranged on said base, means for directing the material to be pressed to one end of said housing, a plunger acting in said housing for pressing the material arranged therein, a plunger rod for actuating said plunger, means for actuating said plunger rod, a flat belt or apron connected with said plunger, a plurality of rollers for guiding said belt, said belt closing said means for directing the material to be pressed when said plunger is in its forward position and a weight connected with one end of said belt for causing the same to act on said plunger for withdrawing the plunger.

2. In a baling press of the character described, a base, a housing arranged on said base, a plunger for pressing the material in said housing, a plunger rod for actuating said plunger, said plunger rod having an operating nose rigidly connected therewith and a sliding nose offset from said first mentioned nose, a spring for normally preventing an independent action of the sliding nose, a pair of different size cam members for successively acting on said noses, and means for actuating said cam members.

3. In a baling press of the character described, a base, a housing arranged on said base, a plunger for pressing the material into the housing, a plunger rod for actuating said plunger, a pair of noses connected with said plunger rod, one of said noses being slidingly mounted on the plunger rod, a spring of a predetermined tension engaging one end of said nose for normally preventing the movement of the nose independent of the plunger rod, but permitting a yielding action when the pressure exceeds the normal tension of the spring, a pair of cams for successively engaging said noses for moving the same and said plunger rod and means for actuating said cam.

4. In a baling press of the character described, a base, a housing arranged on said base, a plunger acting in said housing for compressing material therein, a rod for actuating said plunger, a nose rigidly connected with said rod, a second nose off-set from the first mentioned nose, and slidingly mounted on said rod, a spring for normally holding said second mentioned nose against movement independent of said rod, an alarm arranged on said second mentioned nose, means engaging said alarm for sounding the same when the second mentioned nose is moved against the action of said spring and means designed to act successively against said noses for operating said rod.

In testimony whereof I have signed my name to this specification in the presence of two subscribing witnesses.

GEORGE F. MADDEN.

Witnesses:
 ORION A. RUST,
 ERNEST H. BURGESS.

---

Copies of this patent may be obtained for five cents each, by addressing the "Commissioner of Patents, Washington, D. C."